United States Patent
Dalluge

(10) Patent No.: US 9,140,369 B2
(45) Date of Patent: Sep. 22, 2015

(54) FLOATING BALL VALVE SEAL

(71) Applicant: FISHER CONTROLS INTERNATIONAL LLC, Marshalltown, IA (US)

(72) Inventor: Paul R. Dalluge, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 156 days.

(21) Appl. No.: 14/053,704

(22) Filed: Oct. 15, 2013

(65) Prior Publication Data

US 2015/0102251 A1 Apr. 16, 2015

(51) Int. Cl.
*F16K 5/06* (2006.01)
*F16J 15/34* (2006.01)
*F16J 15/44* (2006.01)
*F16K 5/20* (2006.01)

(52) U.S. Cl.
CPC ............ *F16K 5/0689* (2013.01); *F16J 15/3436* (2013.01); *F16J 15/441* (2013.01); *F16K 5/0678* (2013.01); *F16K 5/204* (2013.01); *F16K 5/205* (2013.01)

(58) Field of Classification Search
CPC .................... F16K 5/205; F16K 5/204; F16K 5/06–5/0694; F16J 15/3436; F16J 15/441
USPC ............... 251/315.01–315.16, 314–316, 162, 251/192; 277/579
See application file for complete search history.

(56) References Cited

U.S. PATENT DOCUMENTS

| | | | |
|---|---|---|---|
| 3,218,024 A | 11/1965 | Kroekel | |
| 3,301,523 A | 1/1967 | Lowrey | |
| 3,421,733 A | 1/1969 | Stewart | |
| 3,598,363 A | 8/1971 | Shaw | |
| 4,084,608 A | 4/1978 | Laignel et al. | |
| 4,155,536 A | 5/1979 | Saiki | |
| 4,386,756 A * | 6/1983 | Muchow | 251/172 |
| 4,519,579 A | 5/1985 | Brestel et al. | |
| 4,548,384 A * | 10/1985 | Harding | 251/315.07 |
| 4,579,316 A * | 4/1986 | Velan | 251/162 |
| 4,676,480 A * | 6/1987 | Garceau et al. | 251/163 |
| 4,867,414 A * | 9/1989 | Hubacek | 251/315.16 |
| 4,936,547 A * | 6/1990 | Obst | 251/315.16 |
| 5,313,976 A | 5/1994 | Beasley | |
| 6,378,841 B1 * | 4/2002 | Russell | 251/162 |

(Continued)

FOREIGN PATENT DOCUMENTS

| | | |
|---|---|---|
| DE | 1266594 B | 4/1968 |
| EP | 228150 A1 | 7/1987 |
| EP | 0483611 A1 | 5/1992 |

OTHER PUBLICATIONS

International Search Report for PCT US2011 032915 dated Jun. 20, 2011.

(Continued)

*Primary Examiner* — John Bastianelli
(74) *Attorney, Agent, or Firm* — Marshall, Gerstein & Borun LLP

(57) ABSTRACT

A seal assembly is provided for a rotary ball valve an eccentric cammed ball. The seal assembly may include a seal ring disposed within the valve interior and biased toward the ball element of the valve. A seal ring retainer may be threadedly secured to an interior of the valve body, thereby retaining the seal ring in the valve body.

13 Claims, 3 Drawing Sheets

(56) References Cited

U.S. PATENT DOCUMENTS

| | | |
|---|---|---|
| 6,974,121 B2 * | 12/2005 | Koester et al. ........... 251/315.07 |
| 8,113,484 B2 | 2/2012 | Hostetter et al. |
| 2001/0045231 A1 | 11/2001 | Monod |
| 2005/0211942 A1 * | 9/2005 | Koester et al. ........... 251/315.01 |
| 2009/0095931 A1 | 4/2009 | Stunkard |
| 2011/0266482 A1 | 11/2011 | Dalluge et al. |

OTHER PUBLICATIONS

Written Opinion for PCT US2011 032915 dated Jun. 20, 2011.

Search Report for International Patent Application No. PCT/US2014/060357, mailed Feb. 3, 2015.

Written Opinion for International Patent Application No. PCT/US2014/060357, mailed Feb. 3, 2015.

* cited by examiner

FLOATING BALL VALVE SEAL

FIELD OF THE DISCLOSURE

The present disclosure generally relates seals for rotary ball control valves and, more particularly, to floating seals that are displaceable laterally and axially.

BACKGROUND

Rotary ball valves are used in a wide number of process control system applications to control some parameters of a process fluid such as a liquid, gas, slurry, etc. While the process control system may use a control valve to ultimately control the pressure, level, pH, or other desired parameter of a fluid, the control valve basically controls the rate of fluid flow.

Typically, a rotary ball valve includes a valve body defining a fluid inlet and a fluid outlet. A ball element is mounted in the valve body and rotates about an axis into and out of abutment with a seal assembly, thereby controlling the amount of fluid flow through the valve.

Rotary ball valve components, including the valve body, the ball element, and the seal assembly, are typically constructed of metal. This stands especially true when used in high pressure and/or high temperature applications. However, the ball element and seal assembly can suffer wear due to the continuous engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly, as well as between the seal assembly and the valve body. Similarly, because the frictional forces tend to increase as the components become more worn, the dynamic performance and control characteristics within the valve are worsened, resulting in inefficiencies and inaccuracies in the valve. To alleviate some of these concerns, some seal assemblies are biased such as to provide a more reliable seal against the ball in the closed position.

SUMMARY

A seal assembly is provided for a rotary ball valve having an eccentric cammed ball. In one embodiment, the seal assembly may include a seal ring disposed within the valve interior and biased toward the ball element of the valve. A seal ring retainer may be threadedly secured to an interior of the valve body, thereby retaining the seal ring in the valve body.

DETAILED DESCRIPTION

The floating ball valve seal described herein overcomes several shortcomings of the prior art. The use of a C-seal extends the useful temperature capability well above some of its counterparts which must rely upon elastomeric seals for the secondary seal. However, the use of an elastomeric seal (e.g., O-ring or spring-loaded face seal) is still possible when desired for cost or shutoff. The use of a face seal as a secondary seal provides the seal ring with the freedom to move axially and laterally. Providing the seal ring with the freedom to move laterally gives the seal ring the ability to self adjust and to compensate for any ball or seal misalignments due to machining or assembly tolerances. Reduced seal wear and improved shutoff result.

The seal ring can also move axially in a controlled and limited fashion, under the seating load imparted by a wave spring and limited by a seal ring retainer, causing the ball and seal ring to break contact at some point in travel after the valve has moved from the fully closed position. The contact between the ball and the seal is confined to a region of the valve travel where the valve is fully closed, which results in reduced seal wear and improved shutoff.

Figure 1:
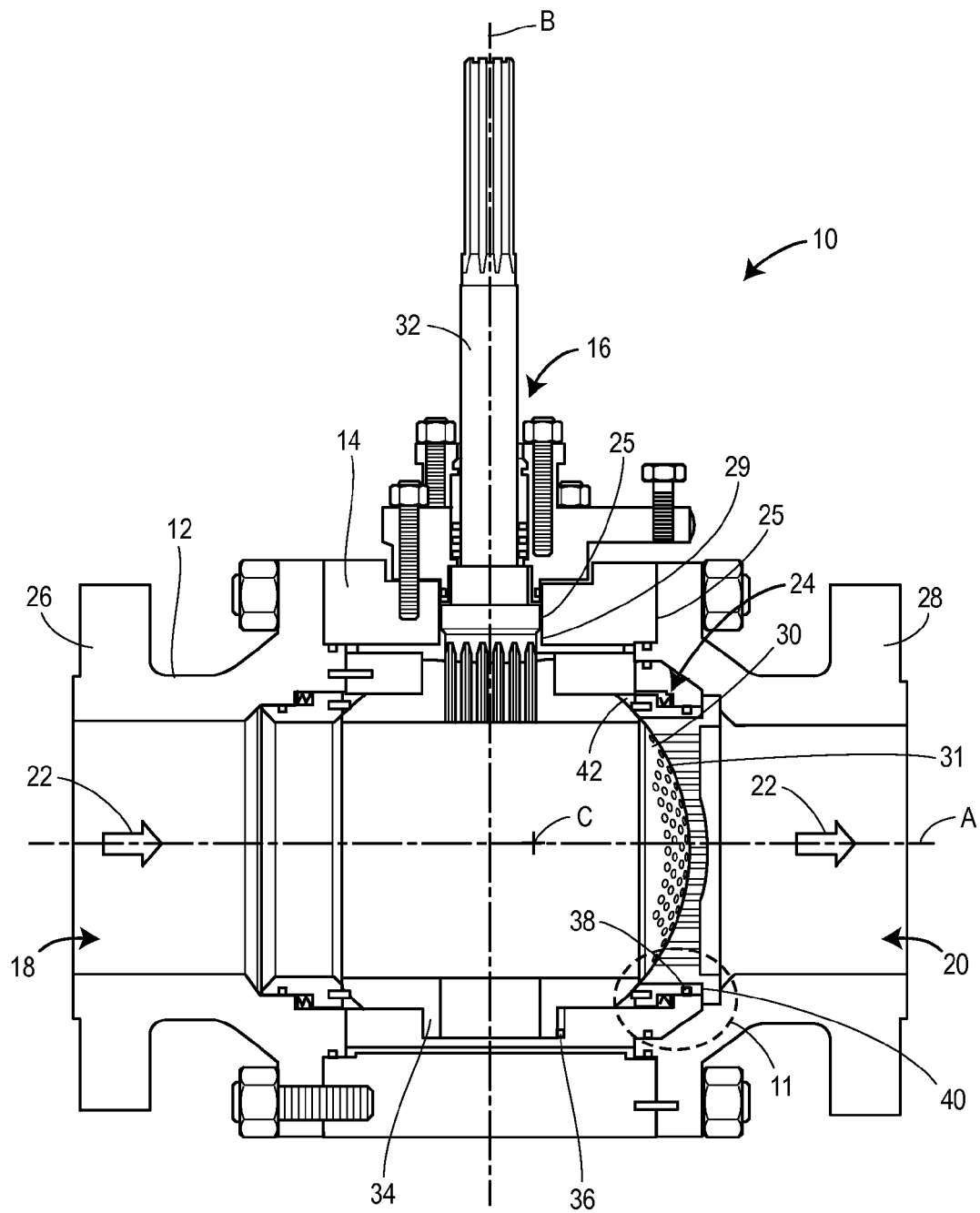
FIG. 1 is a cross-sectional view of a rotary ball valve constructed in accordance with the principles of the present disclosure.

FIG. 1 illustrates a rotary ball valve 10 constructed in accordance with the principles of the disclosure, and generally including a valve body 12, a bonnet 14, a control assembly 16, and a seal assembly 24. The valve body 12 includes an inlet 18, an outlet 20, a primary flowpath 22, and a bonnet opening 25. As indicated by the arrow, the primary flowpath 22 extends from the inlet 18 to the outlet 20 in a direction that is generally parallel to a longitudinal axis A. The inlet 18 is surrounded by an inlet flange 26. The outlet 20 is surrounded by an outlet flange 28. The inlet flange 26 and the outlet flange 28 are adapted to couple the ball valve 10 into a process control pipeline such as by bolting, welding, clamping, or any other known means.

The control assembly 16 includes an eccentric cammed ball element 30, a drive shaft 32, and a support shaft 34. In one embodiment, the drive shaft 32 and the support shaft 34 are separated by a distance. In other embodiments, the drive shaft 32 and the support shaft 34 may be integrally formed as a single piece that extends from a through-bore 29 to a blind bore 36. The ball element 30 has an axis of symmetry C that is offset from the drive shaft axis B. As a result, a sealing surface 31 of the ball element 30 rotates moves with a camming action (e.g., the sealing surface 31 displaces longitudinally, along axis A when the ball element 31 rotates between a closed position and an open position).

As discussed above, the ball element 30 typically moves with a camming action to facilitate a repeatable seal with the seal assembly 24 when in the closed position, as shown in FIG. 1. More specifically, the exterior or sealing surface 31 of the ball element 30 may define a portion of a sphere, all points on the exterior surface of the ball element not being equidistant from a natural pivot point (i.e., axis C) of the ball element 30.

To accommodate the seal assembly 24, the disclosed embodiment of the valve body 12 includes an internal recess 42 disposed downstream from the inlet 18. The internal recess 42 is disposed between the outlet 20 and the ball element 30 of the control assembly 16. The internal recess 42 may have a generally annular shape including an annular surface 38 and a transverse surface 40.

Figure 2:
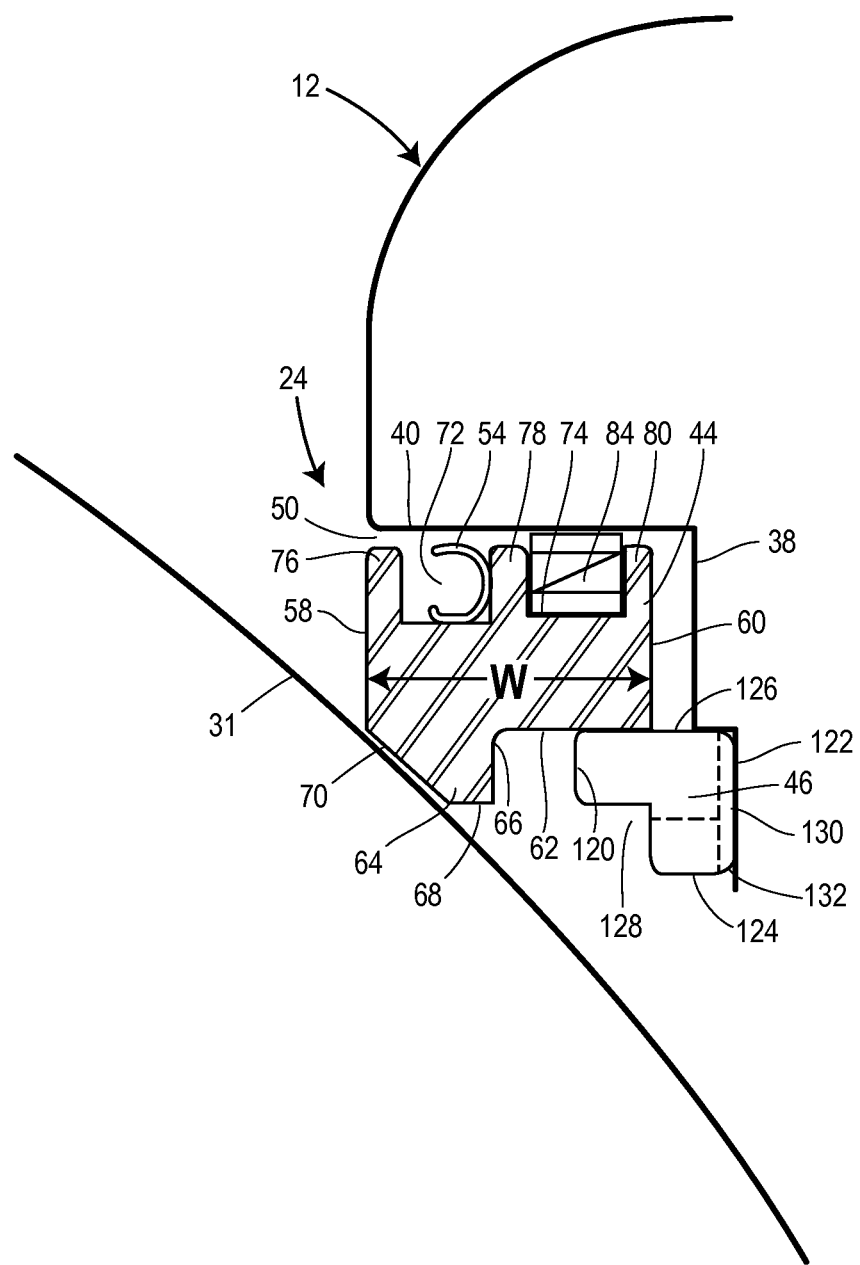
FIG. 2 is an enlarged fragmentary cross-sectional view taken at Circle II of FIG. 1 and illustrating an embodiment of the seal assembly of the rotary ball valve with the rotary ball valve shown in the open position.

Referring now to FIG. 2, which is a detailed view taken from Circle II of FIG. 1, one specific embodiment of a seal assembly 24 constructed in accordance with the teachings of the present disclosure will be described.

The seal assembly 24 includes a seal ring 44 disposed within the interior of the valve body 12. The seal ring 44 is biased toward the ball element to sealingly engage the ball element 30. A seal ring retainer 46 is located downstream of the seal ring 44 and retains the seal ring 44 within the internal recess 42. A secondary leak path 50 is formed between the seal ring 44 and the valve body 12. The secondary leak path 50 is exposed to fluid pressure from fluid flowing through the rotary ball valve 10. A first auxiliary seal, such as a C-seal 54, may be disposed between the seal ring 44 and the valve body 12 to prevent fluid flow through the secondary leak path 50.

As discussed above, the seal ring 44 of the seal assembly 24 is generally annular in shape and may be machined from a wear-resistant metal, such as Alloy 6 or stainless steel with Alloy 6 hardfacing, for example. As illustrated in the cross-sectional view of FIG. 2, the seal ring 44 may be defined laterally by a cylindrical seal inner wall 58 and a cylindrical seal outer wall 60, and a seal upstream wall 62 may extend from the seal outer wall 60 towards the inner wall 58 in a radial direction. A seal ring protrusion 64 may extend from the seal upstream wall 62, and the seal ring protrusion 64 may include by a cylindrical side protrusion wall 66 that may extend from the seal upstream wall 62 in an axial direction (i.e., a direction parallel to the longitudinal axis A). An end wall 68 may extend from the side protrusion wall 66 in a direction parallel to the seal upstream wall 62. A ball engagement surface 70 may extend between the end wall 68 and the seal inner wall 58, and the ball engagement surface 70 may be concave in shape, or complementary to the sealing surface 31 of the ball element 30. More specifically, the ball engagement surface 70 may be contoured to mate with a corresponding portion of the sealing surface 31 of the ball element 30 so that when the rotary ball valve 10 is moved into the closed, or seated, position, the ball engagement surface 70 of the seal ring 44 sealingly engages the sealing surface 31 of the ball element 30. In one embodiment, the ball engagement surface may be partially spherical and concave in shape. The ball engagement surface 70 may be hardfaced to enhance seal cycle life and to prevent seat line galling.

The seal ring 44 also includes an annular inner recess 72 and an annular spring recess 74 disposed between the seal inner wall 58 and the seal outer wall 60. The inner recess 72 and the spring recess 74 may each have a generally rectangular cross-sectional shape and may be adjacently disposed such that an inner ridge 76, an intermediate ridge 78, and an outer ridge 80 are formed in the seal ring 44. However, both the inner recess 72 and the spring recess 74 may have any shape or combination of shapes suitable for a particular application. A bottom portion of each of the inner ridge 76, intermediate ridge 78, and the outer ridge 80 may be axially equidistant from the plane defining the seal downstream wall 62. The inner recess 72 may be sized and shaped to receive the first auxiliary seal 54. The spring recess 74 may be sized and shaped to receive a resilient element, such as the wave spring 84.

Figure 3:
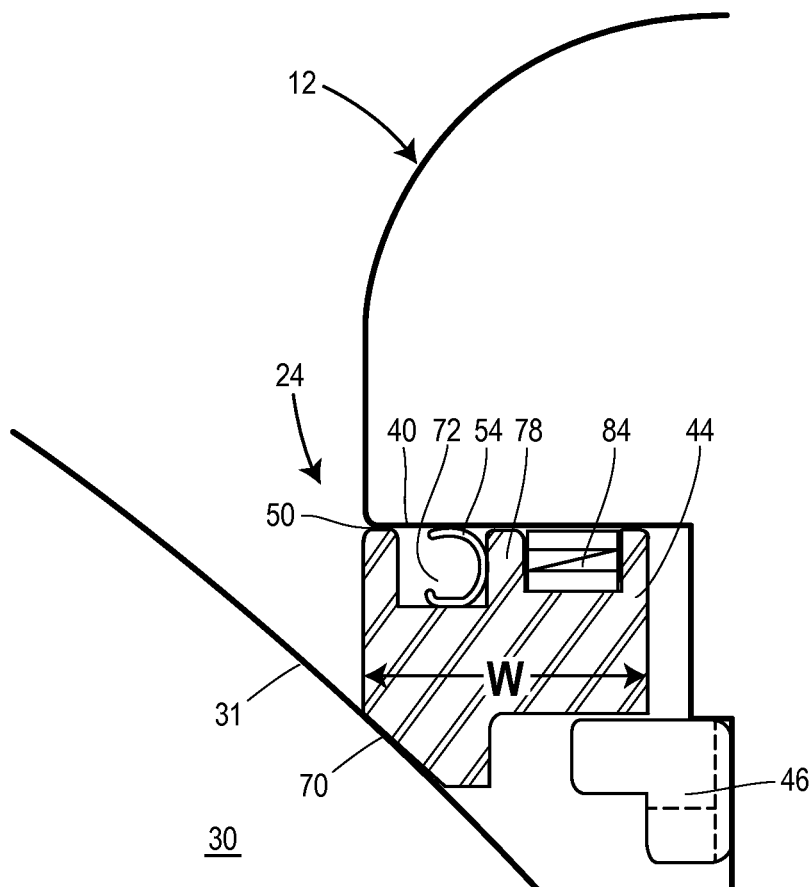
FIG. 3 is another enlarged fragmentary cross-sectional view similar to FIG. 2 and showing the rotary ball valve in the closed position.

As illustrated in FIGS. 2 and 3, the seal assembly 24 may also include the annular seal ring retainer 46, which secures the seal ring 44 within the recess 42 in the valve body 12. The seal retainer 46 may be machined from a corrosion-resistant metal, such as stainless steel, for example. The seal retainer 46 may have an "L" cross-sectional shape, including a cylindrical retainer inner wall 120 and a cylindrical retainer outer wall 122 that each extend in a generally axial direction. A retainer upstream wall 124 and a retainer downstream wall 126 that is parallel to and axially offset from the upstream wall 124 may extend in a generally radial or lateral direction from the retainer outer wall 122 to further define the seal retainer 46. A recess 128 may be formed between the cylindrical retainer inner wall 120 and the retainer upstream wall 124 to provide clearance for the ball element 30. The cylindrical retainer outer wall 122 may include threads 130 that cooperate with corresponding threads 132 on the valve body 12.

A distance from the retainer downstream wall 126 to the transverse surface 40 may be greater than a length of the seal ring outer wall 60. As a result, the seal ring 44 is displaceable in a longitudinal direction, generally parallel to axis A. Thus, the ball engagement surface 70 engages the sealing surface 31 of the ball element 30 before the ball element 30 is rotated to the fully closed position due to the camming action of the ball element 30. More specifically, the seal ring retainer 46 may limit axial displacement of the seal ring 44 to only the angular rotation of the ball element 30 that effects closure of the valve (e.g., less than 20° of rotation from a fully closed position). The seal ring 44 may displace longitudinally slightly to accommodate the remaining camming action of the ball element 30. In this manner, the seal ring 44 cushions the contact between the ball engagement surface 70 and the sealing surface 31, which minimizes mechanical damage to either surface during closing of the ball element 30.

Similarly, the transverse surface 40 is longer than an overall width W of the seal ring 44. As a result, the seal ring 44 is displaceable radially or laterally, towards the annular surface 38 to account for misalignment of the ball element 30 and/or machining errors that are within acceptable tolerances. The seal ring outer wall 60 may contact the annular surface 38 to prevent further radial or lateral movement of the seal ring 44. In other embodiments, the retainer inner wall 120 may form a stop by physically preventing the cylindrical side protrusion wall 66 from moving further towards the annular surface 38.

By trapping the seal ring 44 between the seal ring retainer 46 and the transverse surface 40 of the valve body 12, a size of the seal assembly 24 may be minimized in a longitudinal direction, thereby reducing the overall size of the valve 10.

In order to seal the secondary leak path 50, a mouth of the C-seal 54 may face the general flow path of fluid passing through the secondary leak path 50 such that process fluid flowing through the secondary leak path 50 enters the mouth of the C-seal 54. In the embodiment illustrated in FIG. 2, the mouth of the C-seal 54 may face the inner ridge 76 of the seal ring 44. The C-seal 54 may be dimensioned such that when the valve 10 is in the open position (as illustrated in FIG. 2) and the seal ring 44 contacts the retainer downstream wall 126, a portion of the exterior of the C-seal 54 does not contact the transverse surface 40 of the valve body 12. Accordingly, when the ball element 30 is in the open position, a portion of the process fluid may flow through the secondary leak path 50 between the exterior of the C-seal 54 and the transverse surface 40 without entering the mouth of the C-seal 54.

When the ball element 30 is moved into the closed position (FIG. 3), the ball element 30 contacts the ball engagement surface 70 of the seal ring 44 and displaces the seal ring 44 towards the transverse surface 40 of the valve body 12. As the seal ring 44 is displaced, the distance between the top surface of the inner recess 72 of the seal ring 44 and the transverse surface 40 of the valve body 12 is reduced such that the exterior of the C-seal 54 may contact the transverse surface 40, the inner recess 72, and the intermediate ridge 78 of the seal ring 44. Due to the displacement, the C-seal 54 is compressed such that the outer surface of the C-seal 54 sealingly engages the transverse surface 40, thereby preventing process fluid from flowing between the seal ring 44 and the valve body 12 downstream of the C-seal 54. In this manner, the C-seal 54 seals the secondary leak path 50.

Because the C-seal 54 moves with the seal ring 44 relative to the valve body 12 as the ball element 30 engages with and disengages from the seal ring 44, the C-seal 54 is referred to as a dynamic C-seal. The dynamic C-seal 54 may be fabricated from a corrosion-resistant metal, such as N07718 (Inconel 718). Because the dynamic C-seal 54 is made of metal, the rotary ball valve 10 can operate at higher temperatures than valves using elastomeric seals.

To install the seal assembly 24 to the valve body 12, the seal assembly 24 the C-seal 54 is first placed in the inner recess 72 of the seal ring 44 in the manner previously described, and a resilient element such as the wave spring 84 is placed in the spring recess 74 in the manner previously described. The seal ring 44 is then placed in the valve body 12 in the recess 42, and the seal retainer 46 is placed over the seal ring 44. The seal ring retainer 46 may then be rotated into threaded engagement with the corresponding threads on the valve body 12 to secure the seal retainer 46 to the valve body 12. Once assembled, the seal ring 44 may not be initially be positioned to ensure a proper seal between the ball engagement surface 70 of the seal ring 44 and a portion of the sealing surface 31 of the ball element 30. However, due to the self-aligning property of the seal ring 44 previously described (e.g., the ability to displace both axially and radially), the ball element 30 will axially and radially displace the seal ring 44 as the ball element 30 contacts the ball engagement surface 70 during the closing of the rotary ball valve 10.

While various embodiments have been described above, this disclosure is not intended to be limited thereto. Variations can be made to the disclosed embodiments that are still within the scope of the appended claims.

What is claimed:

1. A valve comprising:
    a valve body having an inlet, an outlet, and a valve interior in fluid communication with the inlet and outlet;
    an eccentric cammed ball element pivotably mounted in the valve interior, an exterior surface of the ball element defining a portion of a sphere, wherein all points on the exterior surface of the ball element are not equidistant from a natural pivot point of the ball element;
    a seal ring disposed within the valve interior and biased toward the ball element, wherein the seal ring is adapted to sealingly engage the ball element;
    a seal ring retainer threadedly secured within a recess in the valve body, the seal ring retainer being removably secured to the valve body by a threaded connection, wherein a secondary leak path exists between the seal ring and the valve body, the secondary leak path being exposed to fluid pressure within the valve; and
    an auxiliary seal disposed between the seal ring and the valve body, the auxiliary seal preventing fluid flow through the secondary leak path,
    wherein the seal ring is movable both axially and radially within the valve body.

2. The valve of claim 1, wherein the seal ring includes a partially spherical concave sealing surface.

3. The valve of claim 1, wherein the auxiliary seal disposed between the seal ring and the valve body is a C-seal.

4. The valve of claim 3, wherein the C-seal is disposed in a recess formed in the seal ring.

5. The valve of claim 4, wherein a mouth of the C-seal is directed into a fluid flowpath.

6. The valve of claim 1, wherein the seal ring includes an inner annular surface and a C-seal disposed within the inner annular surface.

7. The valve of claim 6, wherein the seal ring includes a spring recess and a resilient element disposed within the spring recess, the resilient element biasing the seal ring towards the ball element.

8. The valve of claim 7, wherein the resilient element is a wave spring.

9. The valve of claim 8, wherein an inner annular surface of the recess is longer than an outer wall of the seal ring, when the seal ring assembly is viewed in cross-section.

10. The valve of claim 1, wherein the seal ring retainer has an L-shape when viewed in cross-section.

11. The valve of claim 1, wherein a width of the seal ring is less than a width of a transverse surface of the recess, when the seal assembly is viewed in cross-section.

12. The valve of claim 1, wherein the seal ring retainer limits movement of the seal ring so that contact between the seal ring and the eccentric cammed ball is angularly limited to the angular rotation of the eccentric cammed ball that closes the valve.

13. The valve of claim 12, wherein the contact between the seal ring and the eccentric cammed ball is limited to 20° or less ball rotation from a fully closed position.

* * * * *